US006646743B2

United States Patent
Herman et al.

(10) Patent No.: US 6,646,743 B2
(45) Date of Patent: *Nov. 11, 2003

(54) METHOD AND DEVICE FOR THE SPECTRAL ANALYSIS OF LIGHT

(76) Inventors: Petr Herman, Šromova 867, 198 00 Praha 9-ČM2 (CZ); Jaroslav Večeř, Dejvicka 35, 160 00 Prague 8 (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 10/092,521

(22) Filed: Mar. 8, 2002

(65) Prior Publication Data

US 2002/0159067 A1 Oct. 31, 2002

Related U.S. Application Data

(63) Continuation of application No. 09/297,284, filed as application No. PCT/CZ97/00039 on Nov. 3, 1997, now Pat. No. 6,373,569.

(30) Foreign Application Priority Data

Nov. 4, 1996 (CZ) .............................. 32225-96

(51) Int. Cl.[7] .................................. G01J 4/00
(52) U.S. Cl. ...................................... 356/364; 356/368
(58) Field of Search ................... 356/364, 367, 356/327, 368; 359/484, 494

(56) References Cited

U.S. PATENT DOCUMENTS

| | | | |
|---|---|---|---|
| 3,737,235 A | 6/1973 | Hawes | 356/114 |
| 3,817,634 A | 6/1974 | Barron et al. | 356/114 |
| 4,042,302 A | 8/1977 | Wentz | 356/74 |
| 4,905,169 A | 2/1990 | Buican et al. | 364/525 |
| 5,208,651 A | 5/1993 | Buican | 356/346 |
| 5,949,480 A | 9/1999 | Gerhart et al. | 348/135 |
| 6,373,569 B1 * | 4/2002 | Herman et al. | 356/364 |

FOREIGN PATENT DOCUMENTS

EP  0605391  7/1994

OTHER PUBLICATIONS

Hariharan P: "A Variable Polarization Rotator for Interferometric Measurements" Measurement Science and Technology (For The Whole Collection Use Boca . . LI Max), vol. 4, No. 1, Jan. 1, 1993, pp. 136–137, XP000330197.

P. J. Miller, High Performance Birefringent Imaging Spectrometer, in *Spectral Imaging: Instrumentation, Applications and Analysis*, Proceedings of SPIE, vol. 3920 (2000), pp. 32–39.

\* cited by examiner

*Primary Examiner*—Frank G. Font
*Assistant Examiner*—Philip Sana Natividad
(74) *Attorney, Agent, or Firm*—Antonelli, Terry, Stout & Kraus, LLP

(57) ABSTRACT

The method utilizes the physical phenomenon known as dispersion of the optical rotation. After passage of linearly polarized electromagnetic radiation through the optically active environment (rotator), with the rotating power characterized by a parameter p, and then through the analyzing polarizer, the function R(p) can be measured. For the given active medium and the relative orientation of polarization planes of the input light beam and the analyzing polarizer, R(p) has an unambiguous relation with the spectrum I($\lambda$) of the analyzed radiation ($\lambda$ stands for wavelength) and allows its unambiguous determination by special mathematical methods. In devices based on the above mentioned principle a linearly polarized collimated beam of analyzed radiation propagates through the optical rotator then passes through the analyzer and strikes a single-channel or multi-channel detector which measures R(p) as a function of the parameter p. Finally the desired spectrum is calculated from the known functional relation between the measured rotogram R(p) and I($\lambda$).

51 Claims, 4 Drawing Sheets

METHOD AND DEVICE FOR THE SPECTRAL ANALYSIS OF LIGHT

This Application is a Continuation of patent application U.S. Ser. No. 09/297,284, filed Apr. 28, 1999 which is a 371 of PCT/CF97/00039, filed Nov. 3, 1997.

TECHNICAL FIELD

The invention relates to a method and device for the spectral analysis of electromagnetic radiation.

BACKGROUND ART

Currently there exist two basic physical approaches to the spectral analysis of light utilizing either the phenomenon of angular separation or interference of light.

In the method based on the angular separation, the analyzed light beam interacts with an appropriate optical element and changes the direction of its propagation depending on the wavelength. This way spectral components are spatially separated and can be independently analyzed. The spatial separation is based either on the dispersion of the refractive index in optical prisms or on the properties of the optical grating where the angle of reflection of the incident radiation depends on the wavelength. Commercially available instruments based on these principles are called monochromators which have been widely used in ultraviolet (UV), visible (VIS) and infrared (IR) spectral regions.

Instruments directly utilizing the interference of light are generally based on the Michelson interferometer. The analyzed light is split into the two interfering light beams and so called "interferogram" is measured as a function of the variable optical path in one arm of the interferometer. The spectrum of the analyzed radiation is then extracted from the interferogram by methods of Fourier-transform analysis. The interferometric techniques are preferentially utilized in the IR spectral region because for longer wavelength it is easier to reach the required accuracy of the position of the movable mirror in the interferometer.

DISCLOSURE OF INVENTION

The nature of the invention lies in the utilization of a new physical method for the spectral analysis of electromagnetic radiation, especially light, and in the technical design and construction of devices which utilize this new principle.

The new method according to the present invention utilizes the physical phenomenon known as dispersion of optical rotation, wherein the polarization plane of linearly polarized electromagnetic radiation is rotated during propagation through an active environment of a proper optical element (rotator) and the rotation angle depends on the wavelength of the radiation. If the total intensity of polarized polychromatic radiation is $I=\int I(\lambda)d\lambda$, then after passage through the rotator and through an analyzing polarizer (analyzer) the "rotogram" $R(p)$ can be measured as a function of the parameter p, which characterizes physical and geometrical properties of the rotator:

$$R(p) = \int_\lambda I(\lambda)\cos^2[\varphi_o + \varphi(\lambda, p)]d\lambda \quad (1)$$

wherein $I(\lambda)$ is the spectrum of input radiation, $\phi_o$ denotes an angle between a direction of maximum transmittance of the analyzer and a polarization plane of input radiation, and $\phi(\lambda,p)$ stands for a rotation angle of the polarization plane of radiation with the wavelength $\lambda$ after passage through the rotator. The equation (1) is a Fredholm's integral equation of the first type (Press W. H., Teukolski S. A., Wetterling W. T. and Flannery B. P.: *Integral Equations and Inverse Theory in Numerical Recipies in Fortran*, Cambridge University Press, 1992, p.779) with the kernel $K(\lambda,p)=\cos^2[\phi_o+\phi(\lambda,p)]$. If R(p) is measured, $I(\lambda)$ can be unambiguously calculated from equation (1) using modern advanced methods of numerical analysis, especially the maximum entropy method (MEM) (Skilling J. and Bryan R. K.: Maximum Entropy Image Reconstruction: General Algorithm, *Mon. Not. R. astr. Soc.*, 211 (1984) 111–124). In the special case of a rotator made from an optically active material with a specific optical rotation $D(\lambda)$, the parameter p can represent its adjustable thickness in the direction of the light beam propagation, which gives $\phi(\lambda,p)=p\cdot D(\lambda)$.

The invention determines a spectrum of electromagnetic radiation, particularly of light characterized by a measurement of a rotogram R(p) of the radiation defined by equation (1), wherein a dispersion element made from an optically active medium exhibiting dispersion of optical rotation, placed between two polarizers with arbitrarily oriented polarization planes, preferably parallel or perpendicular, and subsequent mathematical analysis of the rotogram, preferably by the maximum entropy method, is used to determine the spectrum of the electromagnetic radiation.

In the device based on this principle, the linearly polarized beam of radiation first propagates through an optical rotator where the polarization planes of the individual spectral components are rotated depending on their wavelength $\lambda$, then passes through an analyzer and strikes a detector that measures R(p) as a function of the parameter p. Finally the spectrum $I(\lambda)$ is calculated from equation (1).

Figure 1A:
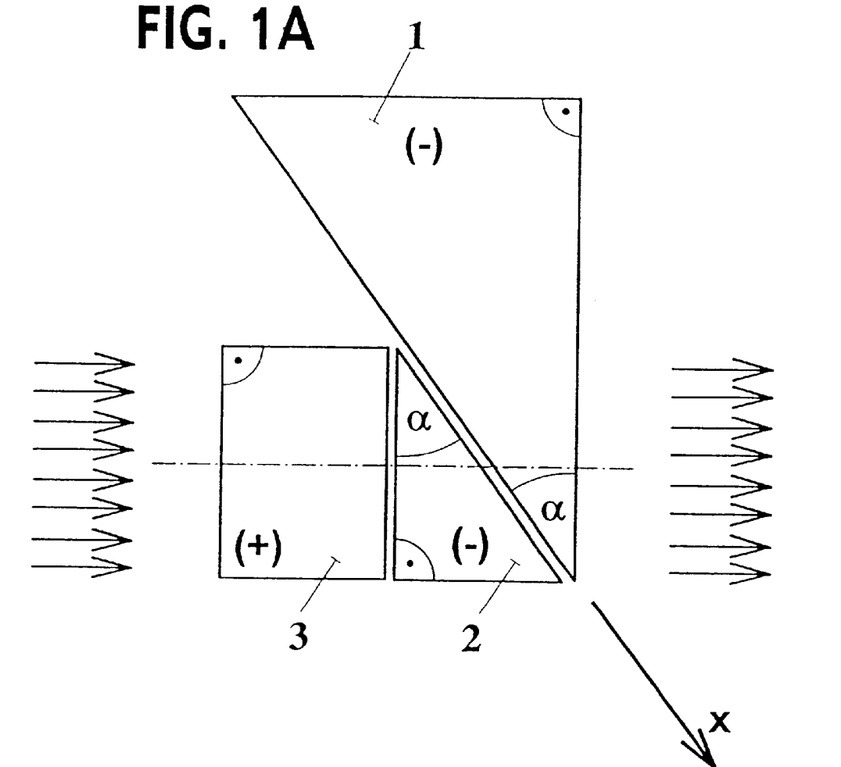

In an apparatus in accordance with the invention there may be utilized one of the many possible configurations of a rotator, which can be manufactured from optically active left-hand and right-hand-rotating forms of quartz crystals (FIG. 1A). The rotator may comprise two left-hand-rotating (−) prisms 1 and 2 and one right-hand-rotating (+) compensation plate 3. The function of the rotator remains the same when the right-hand-rotating prisms and the left-hand-rotating compensation plate are used. The light beam propagates along a direction of parallel aligned optical axes of all three optical elements. A shift of the larger prism 1 by a distance x along its common plane with the smaller prism 2 from the position when the path d of the beam in the right-hand and left-hand-rotating materials is the same, $d^{(+)}=d^{(-)}$, causes a change of effective thickness of the active environment equal to $p=d^{(+)}-d^{(-)}=x \sin \alpha$. The direction of the movement and the angle $\alpha$ are depicted in FIG. 1A. For a set of different shifts x the rotogram R(p) can be measured. Then the spectrum $I(\lambda)$ can be calculated from the measured R(p).

Figure 1B:
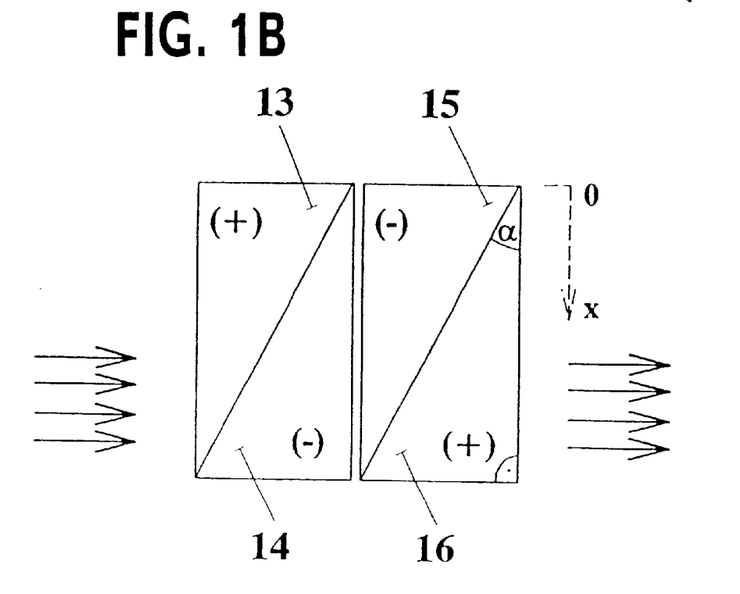

In some special applications the change of the thickness of the rotator can be a disadvantage. The rotator depicted in FIG. 1B, (Hariharan P., Meas. Sci. Technol. 4 (1993) 136–137), does not suffer from this drawback. The rotator consists of four geometrically identical quartz prisms 13, 14, 15, 16, from which two prisms 13, 16 are made from right-hand-rotating quartz and the other two prisms 14, 15 from left-hand-rotating quartz. The optical axes of all four prisms are again oriented parallel with the optical axis of the rotator and the input light propagates through the rotator in the direction of the axis. A shift of the mutually fixed pair of prisms 15, 16 relative to the other pair of mutually fixed prisms 13, 14, in the direction of the x-axis, perpendicular to the direction of the light propagation, causes a change of the parameter $p=d^{(+)}-d^{(-)}=2x\tan\alpha$. The change of p is the same over the whole cross section of the beam. Any shift produces a uniform rotation of polarization planes of rays of the same wavelength.

The invention is further a method for determining the spectrum of a point-size source of light in a single-channel setup with a passage of polarized electromagnetic radiation through an optical element which exhibits uniform dispersion of optical rotation the whole cross-section of the beam of radiation. After passage through the analyzing polarizer, the intensity of the radiation is sequentially measured by a single-channel detector as a function of the parameter p. In this case p represents the thickness of the optically active medium in the direction of the beam propagation. Multiple measurements of the output intensity for different values of p creates the rotogram R(p) from which the desired spectrum is calculated.

The invention is further a method for determining a spectrum of electromagnetic radiation of a two-dimensional source of radiation. A multi-channel setup is used. Polarized radiation is passed from a two-dimensional light source through the optical element which exhibits the same dispersion of the optical rotation across a complete cross-section of the input beam of radiation. After passage through the analyzing polarizer, the intensity of the radiation is sequentially measured by a two-dimensional multi-channel detector, which preferably may be a diode matrix. The intensity is a function of the parameter p, which preferably is the thickness of the optically active medium in the direction of the beam propagation. Rotograms R(p), are simultaneously measured for each element of the planar source of radiation by a corresponding element (pixel) of the two-dimensional multi-channel detector. After mathematical analysis, a spectral map of the investigated object (spectral imaging) may be constructed.

The invention is further a method for determining spectra of a point-size light source in a multi-channel setup. Polarized radiation, which is spectrally homogeneous in the whole cross-section of the beam, passes through an optical element, which exhibits variation in the dispersion of optical rotation in a particular direction across the input beam of radiation. After passage through an analyzing polarizer, a dependence of the light intensity in the direction on the parameter p is measured. Preferably, p is a difference in the light-path in the left-hand and right-hand-rotating medium of the optical element given by a proper geometrical shape of the dispersion element which preferably may be wedge-shaped. The rotogram R(p) is simultaneously measured for the whole range of the parameter p by a multi-channel detector or by a group of individual detectors from which the desired spectrum is calculated. Each detector represents an individual value of the rotogram R(p).

The rotator, can be constructed as a sequence of several consecutive optical components made from left-hand and right-hand rotating forms of optically active crystals, which preferably may be quartz. The optical axes of the individual components are all aligned parallel to each other and the analyzed light propagates through the rotator in the direction of the the optical axes.

DESCRIPTION OF THE PREFERRED EMBODIMENTS

The invention further is a rotator which rotates the polarization plane of linearly polarized radiation. The rotator may be made from uniaxial crystals, preferably quartz. The rotator may consist of two mutually movable components having an identical orientation of the optical rotation. The movable components preferably are prisms (1) and (2). The mutual movement of the prisms causes an identical change in the light-path of the radiation through the active medium across the whole cross-section of the light beam. In some applications a compensation plate having an opposite orientation of optical rotation can be added.

The invention is further a rotator for rotating the polarization plane of linearly polarized radiation. The rotator may be made from uniaxial crystals, preferably quartz. The rotator consists of two mutually fixed optically active components with an opposite orientation of optical rotation. The components preferably are prisms, which introduce a change in rotation of the polarization plane of monochromatic radiation in one direction across an input beam dependent upon a geometrical shape of the components therein.

The invention further is an apparatus which uses a rotator consisting of two right-hand rotating (13), (16) and two left-hand rotating (14), (15) prisms which introduce a change in rotation of a polarization plane for all spectral components of the input beam passing through the rotator. Relative movement of a first pair of the mutually fixed prisms (15), (16) relative to a second pair of the mutually fixed prisms (13), (14) perpendicular to the direction of the light propagation produces for a given relative position of prisms (15), (16) and (13), (14) an identical rotation of the polarization plane for all rays of the beam of identical wavelength across the whole cross-section of the beam for the whole range of possible relative positions of prisms (15), (16) and (13), (14).

Figure 2:
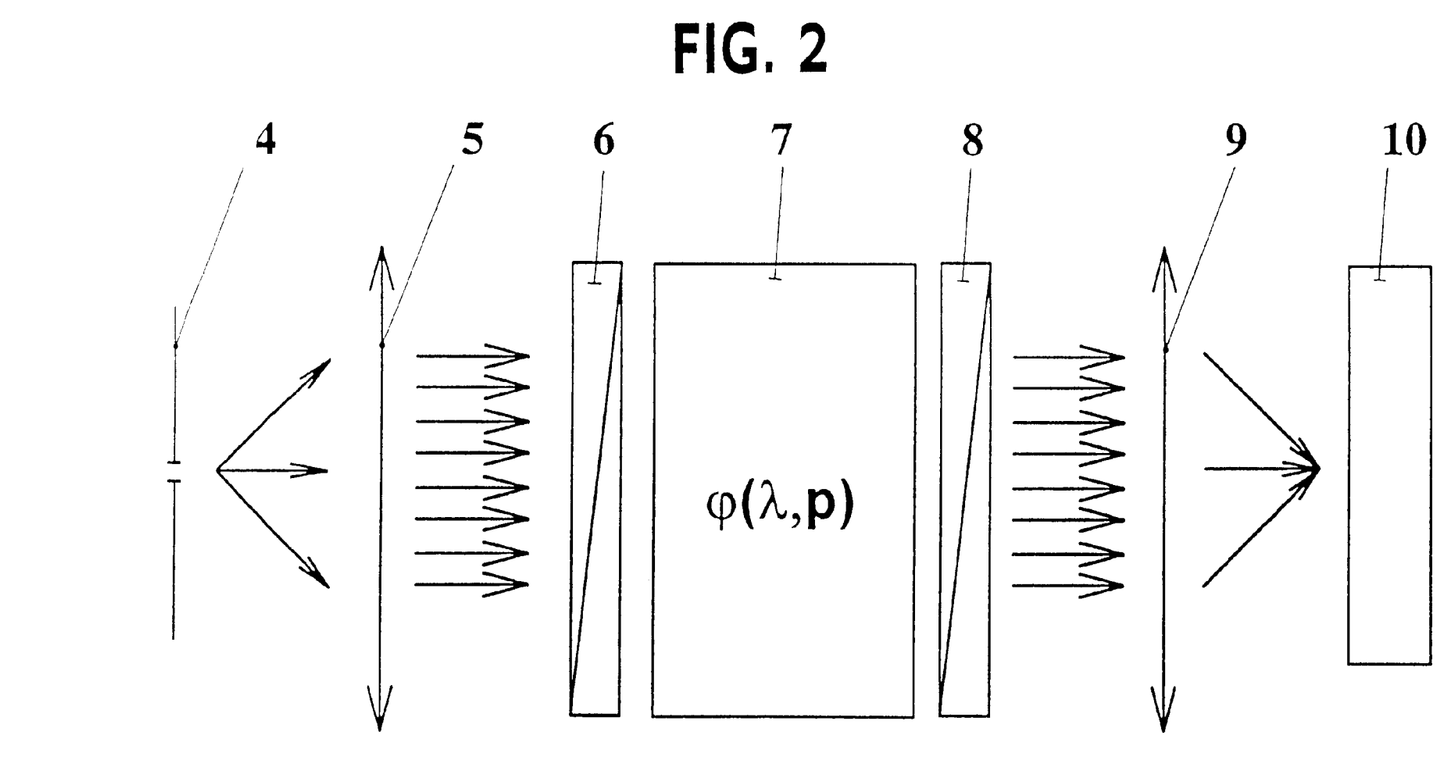

The invention comprises an apparatus for providing single-channel spectral analysis of a beam or a point-size source of electromagnetic radiation. The apparatus has an aperture 4, optical system 5, polarizer 6, followed by quartz rotator 7, analyzing polarizer 8, optical system 9 and single-channel detector 10, as depicted in FIG. 2. In the case of a collimated beam, the aperture 4, the optical system 5 and/or the optical system 9 can be omitted.

The invention also is an apparatus for providing simultaneous multi-channel measurement of spectra of a planar light source. The apparatus comprises optical systems 5 and 9, that image a planar light source and utilizes a two-dimensional multi-channel detector 10. The aperture 4 can be omitted in this case.

The invention further is an apparatus for providing multi-channel spectral analysis of a collimated beam or point-size light source of electromagnetic radiation. A rotator is used having prisms 11 and a multi-channel detector 12. In the case of a collimated beam, the aperture 4, the optical system 5 and/or the optical system 9 can be omitted.

The invention is illustrated by the following examples.

EXAMPLES

Example 1

A single-channel method for determining the spectrum of a point-size source of light is as follows: In the apparatus depicted in FIG. 2, electromagnetic rotation from aperture 4 is collimated by optical system 5 and is linearly polarized by the polarizer 6. Then the electromagnetic radiation passes through quartz rotator 7, depicted in FIG. 1A or 1B, then passes through analyzer 8, and finally is projected by optical system 9 onto a single-channel detector 10, where the rotogram R(p) is measured. The apparatus of FIG. 2 was experimentally assembled and its function was verified including a calculation of the spectrum I($\lambda$) by the maximum entropy method.

Figure 3A:
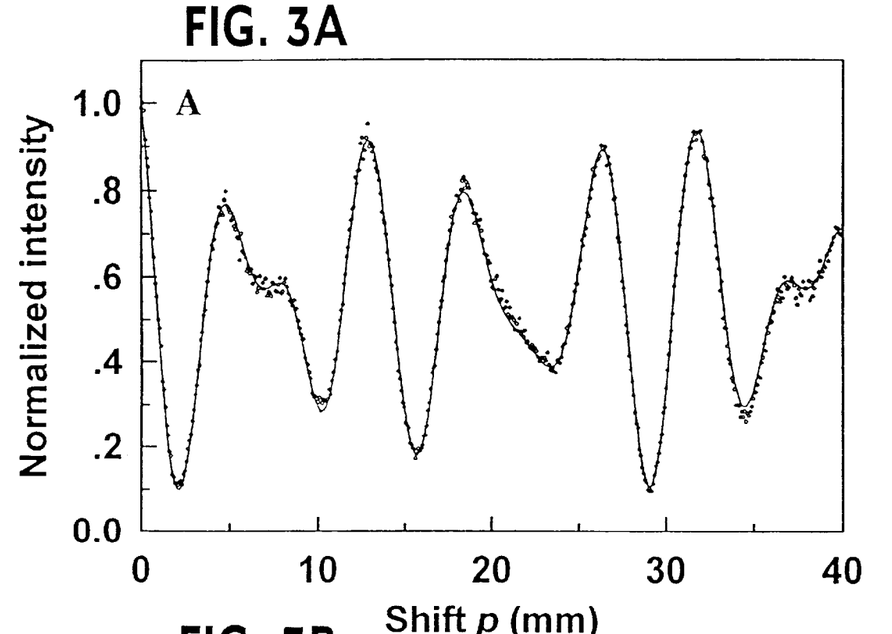
Figure 3B:
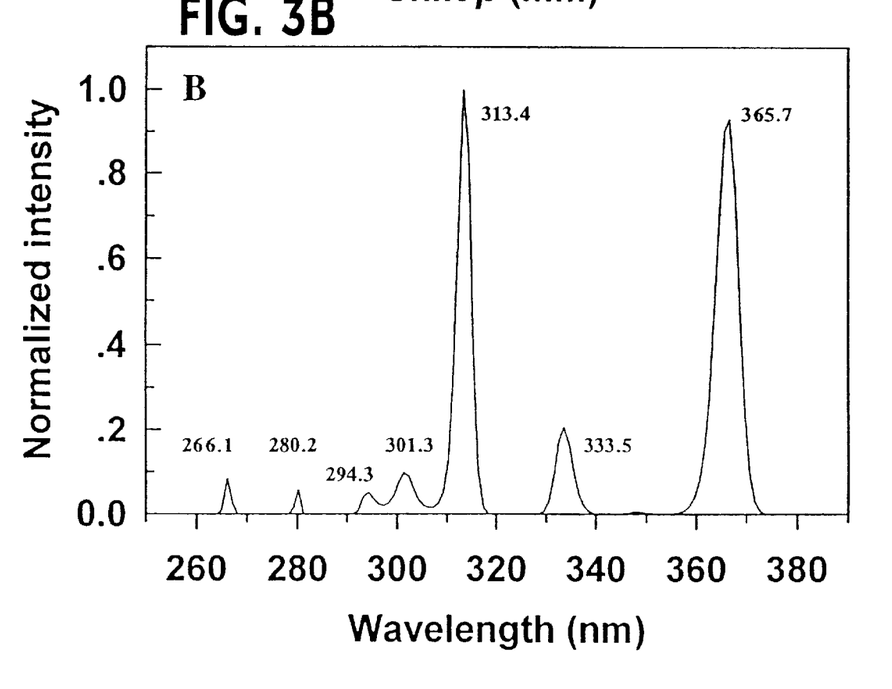

A measurement and an analysis of part of the spectrum of mercury calibration lamp in the spectral region 260–400 nm is illustrated in FIG. 3. The upper panel (FIG. 3A) represents an experimentally measured rotogram (opened circles) and its best fit according to equation (1) (solid line). The lower panel (FIG. 3B) represents a calculated spectrum $I(\lambda)$ of the lamp. Using the invention it was possible to detect all spectral lines of the mercury lamp, which were for control also measured by a grating spectrometer. The spectral positions of the calculated lines were in agreement with the published values of the spectral lines of mercury (Valouch M.: Pitimistné Logaritmické Tabulky a Tabulky Konstant, SNTL, Praha, 1967). Only the maximum at 294.3 nm corresponds to the superposition of two unresolved lines. In order to resolve those lines and to further narrow the other calculated lines, it is necessary to obtain more precise experimental data of the rotogram $R(p)$.

This method also permits a simple determination of the wavelength $\lambda_o$ of monochromatic radiation. For monochromatic radiation and the rotator depicted in FIG. 1A or (FIG. 1B), the equation (1) has a form: $R(p)=I\cos^2[\phi_o+p\cdot D(\lambda_o)]$, where $p=x\cdot\sin\alpha$ as in FIG. 1A or $p=2\times\tan\alpha$ as in FIG. 1B. From the periodicity of $R(p)$ (e.g. from positions of the maxima or minima), it is possible to calculate the specific optical rotation $D(\lambda_o)$ and consequently determine the corresponding wavelength $\lambda_o$ either by calculation, if $D(\lambda)$ has an analytical form, or from a table, when the function $D(\lambda)$ is tabulated. This approach can be used to determine, for example, the wavelength of tunable dye lasers.

Example 2

A simultaneous multi-channel measurement of spectra of a two dimensional light source e.g., spectral imaging (suitable for microscopes, cameras, telescopes etc.) is as follows: In contrast to the single-channel method (FIG. 2), the optical system 5 images a two-dimensional light source and utilizes a two-dimensional multi-channel detector instead of a point-size light source and a single-channel detector 10. Any particular element of the two-dimensional light source is projected onto a corresponding pixel of the multichannel detector. This way the rotograms $R(p)$ for all pixels are measured simultaneously. The mathematical analysis of the rotograms $R(p)$ gives a two-dimensional spectral map of the investigated object.

Example 3

Figure 4:
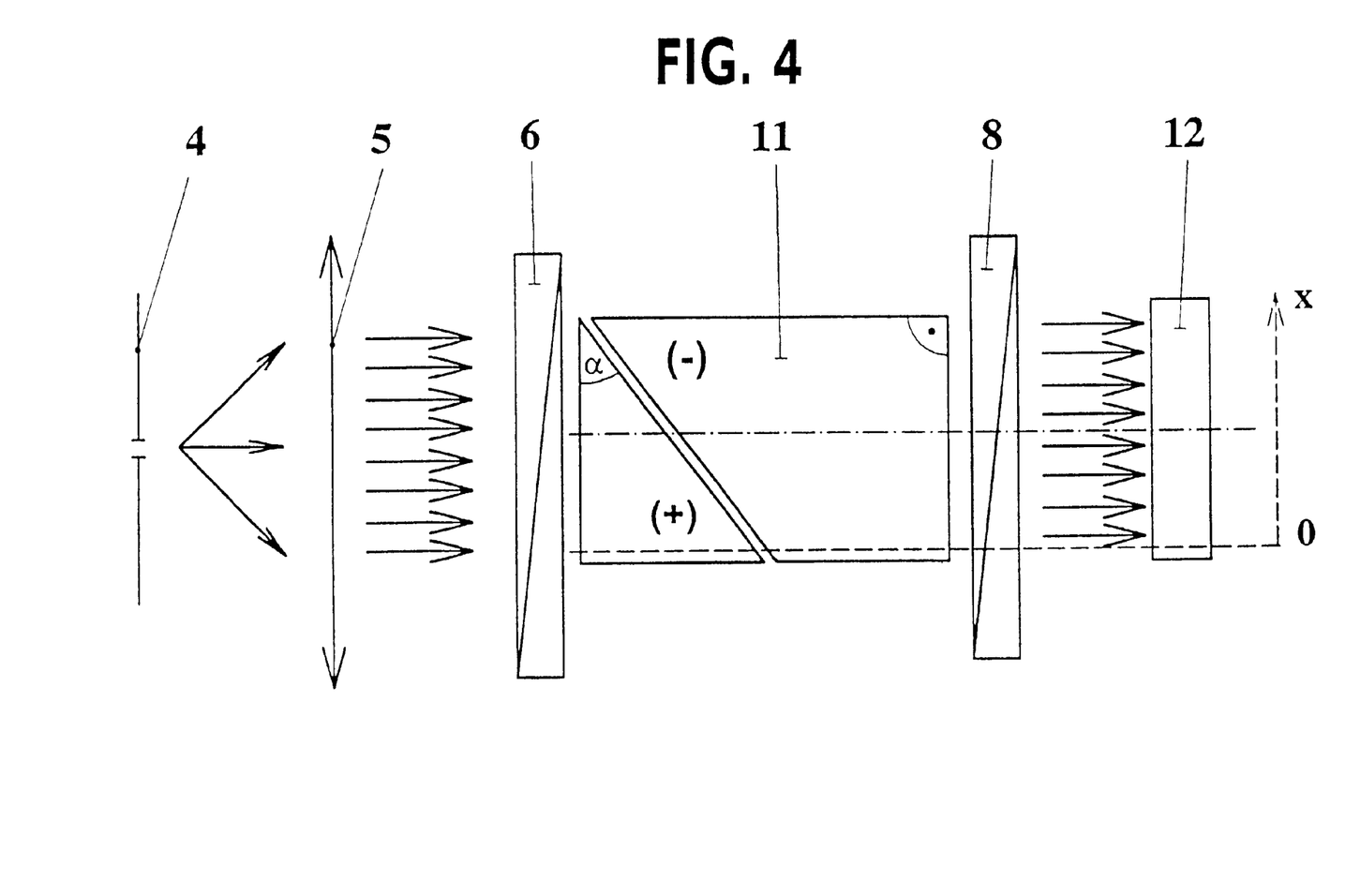

A multi-channel method for determining spectra of a point-size light source is as follows: The method is depicted with reference to FIG. 4 for a special case of the rotator 11 being manufactured from quartz crystals. The rotator has two mutually fixed quartz prisms with the opposite optical rotation. The parameter $p=d^{(+)}-d^{(-)}=2\times\tan\alpha$ changes across the rotator in the direction of the x-axis of a linear multi-channel detector 12. The dashed line represents a path of light ray for which the rotation of the polarization plane is zero for any wavelength e.g., $p=0$. The rotogram $R(p)$ is simultaneously measured the whole interval of values of the parameter p. A correction of rotogram $R(p)$ for the light-intensity profile across the input light beam in the direction of x-axis is possible with analyzer 8 being removed.

Industrial Utilization

The invention can be utilized anywhere where the spectral properties of light have to be analyzed. The invention is applicable to very sensitive scientific instruments (absorption or emission spectrographs) having a high light throughput or small compact accessories for existing optical devices. e.g. microscopes, telescopes, cameras, etc. which convert the devices to the hyper spectral imagers. The devices then can be employed in astronomy, medicine, for airborne monitoring of Earth, i.e. in agricultural, geological, ecological or military applications, and further e.g. in physics, chemistry, or biology.

What is claimed is:

1. A method for determining spectral content of electromagnetic radiation comprising:

passing linearly polarized electromagnetic radiation through a rotator, the rotator being an element exhibiting wavelength dependent dispersion of a polarization angle which rotates a polarization plane of all spectral components of the electromagnetic polarized radiation by an angle determined by both a wavelength of the polarized electromagnetic radiation and a physical and/or geometric characteristic of the rotator represented by a parameter p, the parameter p representing an extent to which the polarization plane of all spectral components is rotated, the polarized electromagnetic radiation after passing through the rotator passes through an output polarizer and impinges upon a detector which measures an intensity of at least a single point of the polarized electromagnetic radiation for plural values of the parameter p which produces a set of intensity values comprising a mathematical function of p and wavelength from which at least spectral information is mathematically extracted; and wherein rotation of the polarization plane of all spectral components is not the same for any ray across an extent of the polarized electromagnetic radiation incident on a surface of the rotator.

2. A method in accordance with claim 1 wherein:
    the detector is a single channel detector.

3. A method in accordance with claim 1 wherein:
    the detector is a multichannel detector.

4. A method in accordance with claim 1 wherein:
    the rotator comprises left- and right-hand polarization rotating elements with a difference in polarization rotation of the polarized electromagnetic radiation passing through the polarization rotating elements being caused by moving the polarization rotating elements to change total polarization rotation of the polarized electromagnetic radiation passing through the rotator.

5. A method in accordance with claim 2 wherein:
    the rotator comprises left- and right-hand polarization rotating elements with a difference in polarization rotation of the polarized electromagnetic radiation passing through the polarization rotating elements being caused by moving the polarization rotating elements to change total polarization rotation of the polarized electromagnetic radiation passing through the rotator.

6. A method in accordance with claim 3 wherein:
    the rotator comprises left- and right-hand polarization rotating elements with a difference in polarization rotation of the polarized electromagnetic radiation passing through the polarization rotating elements being caused by moving the polarization rotating elements to change total polarization rotation of the polarized electromagnetic radiation passing through the rotator.

7. A method in accordance with claim 1 wherein:
the polarized electromagnetic radiation is of a single wavelength and a periodicity of the intensity values is used to determine the single wavelength.

8. A method in accordance with claim 1 wherein:
the polarized electromagnetic radiation is monochromatic light.

9. A method in accordance with claim 1 wherein:
the spectral information is mathematically extracted by a maximum entropy method.

10. A method in accordance with claim 2 wherein:
the spectral information is mathematically extracted by a maximum entropy method.

11. A method in accordance with claim 3 wherein:
the spectral information is mathematically extracted by a maximum entropy method.

12. A method in accordance with claim 4 wherein:
the spectral information is mathematically extracted by a maximum entropy method.

13. A method in accordance with claim 5 wherein:
the spectral information is mathematically extracted by a maximum entropy method.

14. A method in accordance with claim 6 wherein:
the spectral information is mathematically extracted by a maximum entropy method.

15. A method in accordance with claim 7 wherein:
the spectral information is mathematically extracted by a maximum entropy method.

16. A method in accordance with claim 8 wherein:
the spectral information is mathematically extracted by a maximum entropy method.

17. A method in accordance with claim 1 wherein:
the intensity of the polarized electromagnetic radiation is measured by the detector to produce a quantity R(p) defined as follows:

$$R(p) = \int_\lambda I(\lambda)\cos^2[\varphi_o + \varphi(\lambda, p)]d\lambda.$$

18. A method in accordance with claim 1 wherein: the spectral information is a spectrum.

19. A method in accordance with claim 1 wherein:
the spectral information is a position of a spectral maximum.

20. A method in accordance with claim 1 wherein:
the spectral information is a spectral bandwidth.

21. A method in accordance with claim 1 wherein:
the spectral information is a set of positions of multiple spectral maxima.

22. An apparatus for performing spectral analysis comprising:
a rotator comprising at least two polarization rotating elements, each element rotating incident polarized electromagnetic radiation passing through the rotating element, the rotator having two faces with a first face receiving incident polarized electromagnetic radiation with the first face and a second face outputting polarized electromagnetic radiation after passing through the rotator, at least one pair of the at least two polarization rotating elements comprising opposed faces which form a non-orthogonal angle with the polarized electromagnetic radiation passing through the rotator with relative displacement of the at least two polarization rotating elements at an angle to a direction of the incident polarized electromagnetic radiation causing the polarized electromagnetic radiation passing through the rotator to be rotated; and an output polarization analyzer for analyzing the electromagnetic radiation which has passed through the rotator; and wherein
the rotator comprises two pairs of polarization rotating elements with the first face being a face of one of the pairs of elements and the second face being a face of another of the pair of elements, each of the pairs of elements having two substantially parallel faces with one face thereof receiving incident polarized electromagnetic radiation at a substantially orthogonal angle with the one face and another face thereof outputting the polarized electromagnetic radiation at a substantially orthogonal angle and a pair of parallel opposed faces which form a non-orthogonal angle with the polarized electromagnetic radiation passing through the rotator with relative movement of the polarization rotating elements causing the polarized electromagnetic radiation passing through the rotator to be rotated.

23. An apparatus in accordance with claim 22 wherein:
the pair of elements individually rotates the polarized electromagnetic radiation in an identical direction.

24. An apparatus in accordance with claim 22 wherein:
the pair of elements individually rotate the polarized electromagnetic radiation in opposite directions.

25. An apparatus in accordance with claim 22 wherein:
each pair of elements is configured with the opposed non-orthogonal faces juxtaposed so that a rectangle is formed comprised in cross section of two equal right triangles.

26. An apparatus in accordance with claim 25 wherein:
one element of each pair of elements rotates the plane polarized electromagnetic radiation in a direction opposite to another element of each pair of elements.

27. An apparatus in accordance with claim 25 wherein:
rotation of the plane polarized electromagnetic radiation across a surface of each pair of elements is zero when the two pairs of elements are aligned to form a rectangle and is non-zero when the two pairs of elements are not aligned to form a rectangle.

28. An apparatus for performing spectral analysis comprising:
a rotator comprising at least two polarization rotating elements, each element rotating incident polarized electromagnetic radiation passing through the rotating element, the rotator having two faces with a first face receiving incident polarized electromagnetic radiation with the first face and a second face outputting polarized electromagnetic radiation after passing through the rotator, at least one pair of the at least two polarization rotating elements comprising opposed faces which form a non-orthogonal angle with the polarized electromagnetic radiation passing through the rotator with relative displacement of the at least two polarization rotating elements at an angle to a direction of the incident polarized electromagnetic radiation causing the polarized electromagnetic radiation passing through the rotator to be rotated; and an output polarization analyzer for analyzing the electromagnetic radiation which has passed through the rotator; and wherein a pair of the elements are aligned with the opposed parallel faces forming a rectangle comprised of a right triangle and a quadrilateral and rotation of the polarization plane for all rays passing through the elements is not uniform.

29. An apparatus in accordance with claim 28 wherein:
one element of the pair of elements rotates the plane polarized electromagnetic radiation in a direction opposite to another element of the pair of elements.

30. An apparatus for performing spectral analysis comprising:

a rotator comprising at least two polarization rotating elements, each element rotating incident polarized electromagnetic radiation passing through the rotating element, the rotator having two faces with a first face receiving incident polarized electromagnetic radiation with the first face and a second face outputting polarized electromagnetic radiation after passing through the rotator, at least one pair of the at least two polarization rotating elements comprising opposed faces which form a non-orthogonal angle with the polarized electromagnetic radiation passing through the rotator with relative displacement of the at least two polarization rotating elements at an angle to a direction of the incident polarized electromagnetic radiation causing the polarized electromagnetic radiation passing through the rotator to be rotated; and an output polarization analyzer for analyzing the electromagnetic radiation which has passed through the rotator; and wherein rotation of the polarization plane is not uniform when the pair of elements is aligned with the opposed faces forming a rectangle.

31. An apparatus in accordance with claim 22 comprising:
an input polarizer, placed before the rotator, which provides the incident polarized electromagnetic radiation.

32. A rotator comprising:
at least two polarization rotating elements, each element individually rotating incident polarized electromagnetic radiation passing through the rotating element, the rotator having two faces with a first face receiving incident polarized electromagnetic radiation and a second face outputting polarized electromagnetic radiation after passing through the rotator as only a single beam of polarized electromagnetic radiation, at lease one pair of the at least two polarization rotating elements having opposed faces which form a non-orthogonal angle with the polarized electromagnetic radiation passing through the rotator with relative displacement of the at least two polarization rotating elements at an angle to a direction of the incident polarized electromagnetic radiation causing the polarized electromagnetic radiation passing through the rotator to be rotated; and an output which outputs rotated polarized electromagnetic radiation.

33. A rotator in accordance with claim 32 wherein:
the pair of elements individually rotates the polarized electromagnetic radiation in an identical direction.

34. A rotator in accordance with claim 32 wherein:
the pair of elements individually rotate the polarized electromagnetic radiation in opposite directions.

35. A rotator in accordance with claim 32 comprising:
two pairs of polarization rotating elements with the first face being a face of one of the pairs of elements and the second face being a face of another of the pair of elements, each of the pairs of elements having two faces with one face thereof receiving incident polarized electromagnetic radiation and another face thereof outputting the polarized electromagnetic radiation and a pair of parallel opposed faces which form a non-orthogonal angle with the polarized electromagnetic radiation passing through the rotator with relative displacement of the polarization rotating elements causing the polarized electromagnetic radiation passing through the rotator to be rotated as a function of the amount of displacement.

36. A rotator in accordance with claim 33 wherein:
each pair of elements is configured with the opposed non-orthogonal faces juxtaposed so that a rectangle is formed comprised in cross section of two equal right triangles.

37. A rotator in accordance with claim 36 wherein:
one element of each pair of elements rotates the plane polarized electromagnetic radiation in a direction opposite to another element of each pair of elements.

38. A rotator in accordance with claim 36 wherein:
rotation of the plane polarized electromagnetic radiation across a surface of each pair of elements is zero when the two pairs of elements are aligned to form a rectangle and is non-zero when the two pairs of elements are not aligned to form a rectangle.

39. A rotator in accordance with claim 36 wherein:
a pair of the elements are aligned with the opposed parallel faces forming a rectangle comprised of a right triangle and a quadrilateral and rotation of the polarization plane for all rays passing through the elements is not uniform.

40. A rotator in accordance with claim 39 wherein:
one element of the pair of elements rotates the plane polarized electromagnetic radiation in a direction opposite to another element of the pair of elements.

41. A rotator in accordance with claim 32 wherein:
rotation of the polarization plane is not uniform when the pair of elements is aligned with the opposed faces forming a rectangle.

42. A rotator in accordance with claim 35 wherein:
each of the two pairs of elements has two substantially parallel faces with one face thereof receiving incident polarized electromagnetic radiation at a substantially orthogonal angle and with another face thereof outputting the polarized electromagnetic radiation at a substantially orthogonal angle.

43. A rotator in accordance with claim 35 wherein:
the two faces are substantially parallel and the first face receives and the second face outputs polarized electromagnetic radiation at a substantially orthogonal angle.

44. A rotator in accordance with claim 36 wherein:

the two faces are substantially parallel and the first face receives and the second face outputs polarized electromagnetic radiation at a substantially orthogonal angle.

45. A rotator in accordance with claim 37 wherein:

the two faces are substantially parallel and the first face receives and the second face outputs polarized electromagnetic radiation at a substantially orthogonal angle.

46. A rotator in accordance with claim 38 wherein:

the two faces are substantially parallel and the first face receives and the second face outputs polarized electromagnetic radiation at a substantially orthogonal angle.

47. A rotator in accordance with claim 39 wherein:

the two faces are substantially parallel and the first face receives and the second face outputs polarized electromagnetic radiation at a substantially orthogonal angle.

48. A rotator in accordance with claim 40 wherein:

the two faces are substantially parallel and the first face receives and the second face outputs polarized electromagnetic radiation at a substantially orthogonal angle.

49. A rotator in accordance with claim 41 wherein:

the two faces are substantially parallel and the first face receives and the second face outputs polarized electromagnetic radiation at a substantially orthogonal angle.

50. A rotator in accordance with claim 42 wherein:

the two faces are substantially parallel and the first face receives and the second face outputs polarized electromagnetic radiation at a substantially orthogonal angle.

51. A rotator in accordance with claim 35 wherein:

the relative displacement is the displacement of the opposed surfaces relative to each other.

\* \* \* \* \*